Nov. 10, 1942.  W. G. SMITH  2,301,230
SOCKET CLAMP FOR DRILLS
Filed Nov. 19, 1940  2 Sheets-Sheet 1
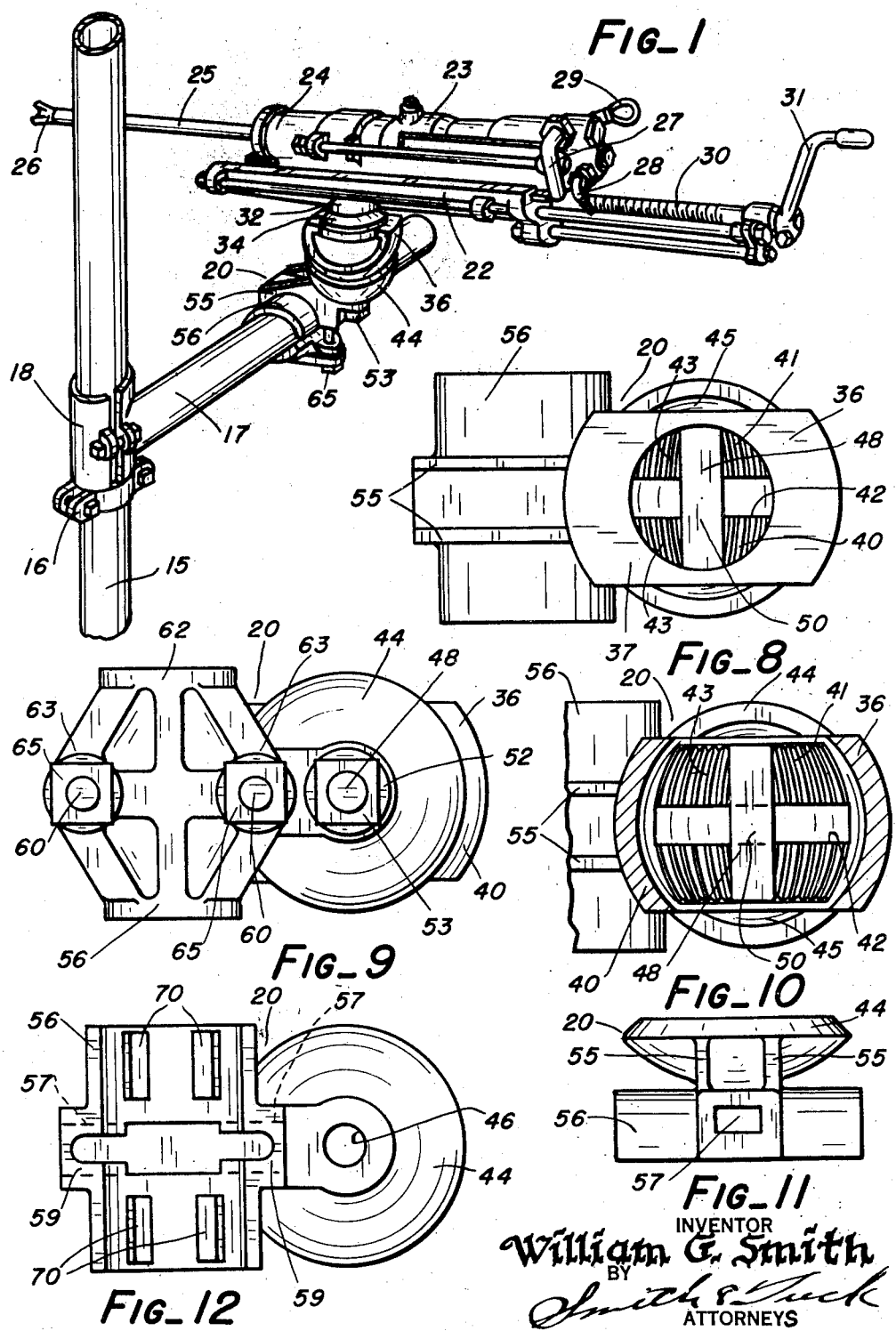
INVENTOR
William G. Smith
BY
ATTORNEYS

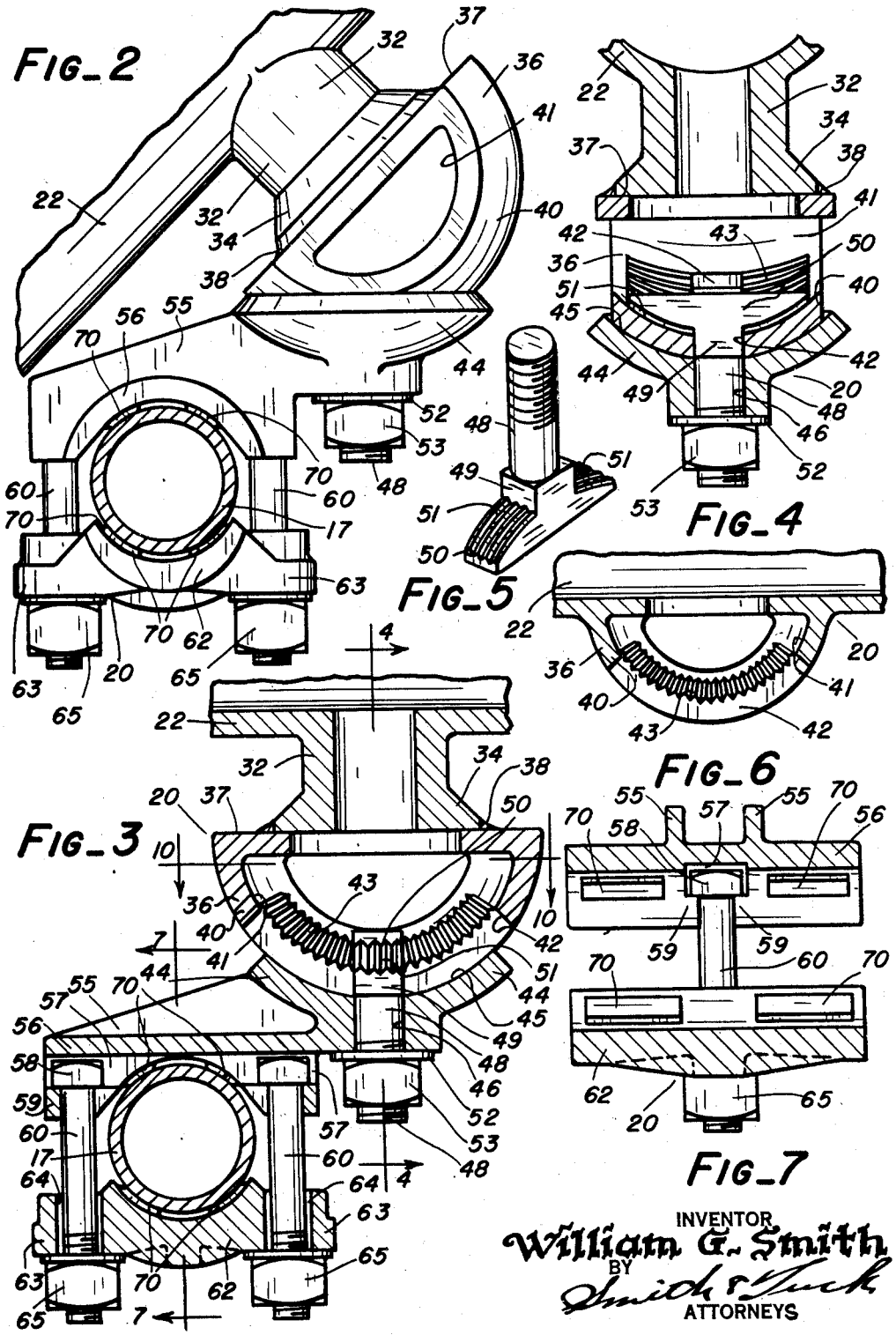

Patented Nov. 10, 1942

2,301,230

UNITED STATES PATENT OFFICE 2,301,230

SOCKET CLAMP FOR DRILLS

William G. Smith, Seattle, Wash., assignor of fifty per cent to W. L. Grill, Seattle, Wash.

Application November 19, 1940, Serial No. 366,231

8 Claims. (Cl. 255—51)

My invention relates to improvements in a socket clamp for drills and is particularly designed for use in mining and construction pursuits wherein pneumatic drills are employed for piercing the earth preparatory to blasting.

While my invention is very useful in connection with the mounting of drifting drills in connection with upright drill columns and lateral supporting arms, it is also useful for the mounting of diamond drills, power winches and other types of heavy machinery used in mining and construction endeavors in which it is often desirable to mount the machine for rotative or swiveled movement.

It is well known that the clamps of present day use are of such a construction that they have limited usefulness unless the drill operator can take the time to loosen a multitude of bolts and nuts to properly adjust the clamp in connection with the direction in which the drill is traveling. It has often been observed that due to unusual rock formations, drill steel being advanced by the drifting drills will follow a fissure or veer away from hard rock and twist out of line in which they are intended to be directed by the rigidly clamped drilling machine. In such cases it is necessary and practical for economical operation that the drill be subsequently aligned with the drift of the hole being drilled to reduce wear on the operating parts of the drill and to relieve undue strain on the guide shell and clamp employed in connection with the drill. Misalignment of the drill steel to the drill rock is a constant source of difficulty in mines and its elimination is of paramount importance to drillers. The clamps in use at this time are also complicated structures having a number of parts and requiring accurate alignment to insure that, when the drilling machine is clamped to its support with the clamp bolts tightened, the drill steel will be directed along the line which it is desired that a hole be drilled.

These and other unfavorable conditions resulting from the use of the present equipment have led to the development of my invention.

It has been an important object of my invention to provide improved clamp means for drills and other machinery, by the use of which, in drilling operations, the drilling machine can be made self-aligning with the greatest of convenience.

Another object of my invention has been to provide, in an improved clamp means, a knuckle or swivel arrangement of simple parts in order that the clamp may be most rapidly and simply adjusted to permit aligning of the drill and the drill steel.

A further object of the invention has been to provide drill clamp means which may be adapted to and associated with standard drilling machinery without materially altering the parts thereof or clamp means which may be incorporated into part of the drilling machinery in the course of regular manufacture without departing materially from that course.

Still another object of my invention has been the provision in an improved clamp of the nature set forth in the foregoing objects of a single tightening bolt securely clamping the knuckle or swivel elements together, and which bolt is the only element that has to be adjusted in order to permit drill alignment.

A still further object of my invention has been the provision in a clamp having a knuckle or swivel device of a minimum number of rugged parts which may be produced simply, and easily assembled for use in drilling operations.

An additional primary object of my invention has been to combine all of the foregoing objects into a single device.

Other objects and advantages of my invention will be apparent in the course of the following description. In the drawings and specification I have set forth a preferred embodiment of my invention, but it will be understood that certain modifications and departures can be made from that teaching without departing from the principles of the invention as defined by the subjoined claims.

In the drawings

Figure 1 is a perspective view of a drill column having a lateral arm mounted thereon and a conventional pneumatic drill machine clamped to the lateral arm by the instrumentality of my socket clamp, Figure 2 is an enlarged detail view showing the lateral arm in cross section and disclosing the general arrangement of the clamp, Figure 3 is a vertical medial sectional view through the clamp mechanism, Figure 4 is a sectional view taken on line 4—4 of Figure 3, Figure 5 is a perspective view of the knuckle bolt employed in connection with my clamp, Figure 6 is a sectional view through a modified form of knuckle member employed in connection with a guide shell of a drill, Figure 7 is a sectional view taken on line 7—7 of Figure 3, Figure 8 is a plan view of the knuckle socket and the associated clamp saddle, Figure 9 is an inverted view showing the socket of Figure 8 as though associated with a movable clamp saddle employed in joining the clamp to a lateral or to a vertical support bar, Figure 10 is a sectional view taken on line 10—10 of Figure 3, Figure 11 is an elevational view of the knuckle socket member and clamp saddle as though taken from the right of Figure 8, and Figure 12 is a bottom view looking upward under the showing of Figure 11.

The numeral 15 refers to a drill column usually comprising a piece of heavy pipe. These drill columns are employed in drifting operations and are designed to be mounted in an upright manner between the floor and ceiling of a tunnel or in certain instances between the side walls of a tunnel. A lock clamp 16 is shown as engaged around the column. A lateral arm 17 is also secured to the column by means of the arm clamp mechanism 18. Lock clamp 16 is usually positioned immediately under the arm clamp 18 to prevent it from sliding downwardly when the clamp bolts are loosened, but at the same time this arrangement permits radial movement of the lateral arm.

My socket clamp is indicated as a whole by the numeral 20 and is shown engaged on the lateral arm 17, to support a pneumatic drill of the conventional type by means of the cone on its guide shell 22.

Resting on the guide shell is the longitudinally movable cylinder 23 which is provided with a chuck 24 for the gripping of a drill rod 25 having a drill bit 26 on its outer end. On the rear end of the cylinder an air feed connection 27 is ordinarily secured and, as well, there is a water connection 28. A throttle 29 valves air into the cylinder to operate the mechanism for imparting percussion to the drill rod. To advance the drill cylinder as the drilling operation goes forward, such pneumatic drills usually have a feed screw 30 which may be manually rotated by the crank 31 and the cylinder slides forward or is withdrawn in the guide shell in accordance with the direction in which the screw is rotated. On the lower portion of the guide shell a stem 32 is provided and this stem mounts the conventional clamp cone 34 which is engaged to clamp the machine in position.

As may be clearly seen in Figures 2, 3, and 4, I secure to the clamp cone the male knuckle segment 36 having the upper flat face 37. The cone is joined to member 36 by means of the bead of welding 38. Member 36 is also provided with the arcuate knuckle portion 40 which has a hollow interior 41. Portion 40 has the cross slot 42, and its inner curved face is provided with friction teeth 43.

For cooperation with the knuckle ball 36 I provide the socket mount 44 which includes the segmental socket 45 having a radius of curvature substantially corresponding to the curve of portion 40. A central bolt hole 46 receives the shank of the knuckle bolt 48.

Knuckle bolt 48 is provided with a square shank 49 which is of a size comparable to the width of the slot 42. The bolt is provided with the T-head 50, the under side of which is curved and toothed at 51 to correspond to the inner curve of the member 36. The width of the head 50 is also comparable to the width of slot 42, whereas the length is considerably greater. The bolt may be inserted through the slot with its longest direction running longitudinal thereof and then the bolt is turned at right angles and partially withdrawn so that the square shank 49 will fit into the slot and the threaded shank 48 will extend downwardly to be inserted into the bolt hole 46. A washer 52 is fitted to the bolt and the nut 53 is also threadedly engaged thereon to secure the members 36 and 45 rigidly together.

The socket 45 is disposed to one side of the main body portion and to assist in maintaining these two parts in rigidly joined relationship I have provided the fillet webs 55.

On the under side of socket mount 44 is formed the clamp saddle 56 which is provided with under cut slots 57 that extend outwardly from the center to just short of the side edges and are adapted to receive the bolt head 58. The slot lips 59 engage under the head 58 of the bolt 60 so that the bolt can be slid or moved inwardly or outwardly slightly but at the same time can not be withdrawn downwardly and out of the engagement in the saddle. This arrangement also prevents the bolt from turning in the clamp saddle.

The lower saddle member 62 has outstanding side ears 63 and bolt holes 64 receive the shanks of the bolts 60, 60. Nuts 65 are threaded onto the saddle clamp bolts and the upper and lower halves of the saddle are rigidly clamped to the lateral arm 17 of the drill supporting mechanism.

In the inner faces of the saddle members 56 and 62 I provide spaced apart bosses 70 which are usually accurately machined to a desired curvature to conform to the curve of the supporting arms to which the saddles are to be aligned.

It is to be remembered that in drilling operations, in mines particularly, the drilling crew is required to transport their equipment, including drills, supporting columns, lateral support arms and the necessary air and water hoses and drill steel to the heading of a drift or tunnel. There the equipment or mechanism is set up, a round of holes is drilled and then it is all dismantled and removed from the heading a sufficient distance to be out of the danger zone which the heading becomes when the round of holes have been packed with blasting powder or dynamite. When the rock face or heading has been blasted down and the blasted material removed, the drillers must repeat the operation. It is extremely important, therefore, that the equipment used is easily assembled and dismantled without requiring great skill on the part of the operators and without requiring any appreciable amount of time for high speed operation. When the drill column and lateral arm has been properly positioned in the heading the saddles 56 and 62 are brought into position on the lateral arm as indicated in Figure 1 and are securely clamped together, each partially encircling the arm to rigidly position the socket 45 in the desired plane and angle.

Ordinarily the ball segment 36 will not be removed completely from the socket 45 when the equipment is dismantled. The bolt 48 and nut 53 only need be loosened to permit this disassembly. When the drill is properly positioned on the lateral support arm and directed as desired, the nut 53 is securely tightened to bring the elements 36 and 45 into close frictional engagement whereupon further swiveling will cease.

If the guide shell and the ball segment 36 have been wholly removed from the socket 45, the T-head 50 of the bolt 48 will be aligned with the slot 42 as it is presented to the socket and the head 50 will slip through the socket slot. It can then be turned at right angles and the square shank 49 be positioned in the slot 42 so that the bolt will not turn when the nut 53 is tightened.

When the drilling machine has been operated and the drill steel has penetrated into the rock being drilled a certain distance it is often found that the drill rod is out of alignment with the longitudinal axis of the pneumatic drill. This of course imparts unusual and unnecessary strain and wearing action upon the parts comprising the drill and an efficient operator will then desire to align the drill and drill rod. All that he need do is loosen the bolt 53 slightly, permitting the elements 36 and 45 to swivel in their relation to each other, and, without even discontinuing the drilling operation, the machine will automatically center or align itself properly with the drill in accordance with the direction in which the drill is traveling. Then the nut 53 may be retightened to reclamp the elements 36 and 45 rigidly together. Additional aligning may also be obtained by loosening one or the other of the nuts 65 or both in some cases, whereby the saddles will be permitted to rotate slightly on the supporting arm to which they are attached and the drill will also align itself.

The toothed or notched area 43 receives the corresponding toothed face 51 of the bolt head and permits the loosening of the bolt sufficiently to swing the member 26 on the vertical axis but will assist in preventing rocking or tilting movement of the head 36 by reason of the slot slipping past the bolt. Such radial adjustments of the drill about the axis defined by the bolt are thus easily accomplished while at the same time rocking movement of the drill is prevented except when the bolt is loosened sufficiently to unseat the toothed areas.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. A socket clamp comprising means for engaging a tool supporting member including an arcuate socket having an axial bolt hole, a hollow knuckle ball-segment seated in the arcuate socket and having a transverse slot through the curved face alignable with the bolt hole in the socket, said ball-segment being rigidly attached to a frame portion of the machine to be clamped to a tool supporting member, a T-bolt having its head in the hollow knuckle ball-segment lateral to the slot therein, the underside of said head being knurled to frictionally engage the inner face of said ball segment, a square shank on said bolt under said head and of a width substantially equal to said slot seated therein, a threaded shank on said bolt passing through said bolt hole in the socket, and a nut on said bolt to tighten the socket and knuckle ball-segment together in adjusted position.

2. A socket clamp comprising a transversely slotted hollow semi-circular segment secured to a portion of the frame of a machine to be clamped, an arcuate socket having a central bolt hole; a T-bolt extending through the slot in the segment and having a square shank equal to and fitted in said slot and its threaded shank inserted through said bolt hole in the arcuate socket the head of said T-bolt frictionally engaging the inner face of said segment to prevent relative swiveling movement of the segment in its socket; means on said bolt to tighten the knuckle ball-segment and socket together, and means on said socket for clamping it to a tool supporting column.

3. A socket clamp comprising a transversely slotted hollow knuckle ball-segment secured to a portion of the frame of a machine to be clamped, an arcuate socket having a central bolt hole, a T-bolt extending through the slot in the segment and having the longest dimension of the head lateral to said slot, and frictionally engaging the inner face of said segment to prevent relative swiveling movement of the segment in its socket, a square shank on said bolt equal to and fitted in said slot, and a threaded shank on said bolt inserted through said bolt hole in the arcuate socket, means on said bolt to tighten the knuckle ball-segment and socket together, and means on said socket for joining it to a tool supporting column.

4. A socket clamp comprising a transversely slotted hollow knuckle ball-segment secured to a portion of the frame of a machine to be clamped, an arcuate socket having a central bolt hole, a T-bolt extending through the slot in the ball segment and having a square shank equal to and fitted in said slot and its threaded shank inserted through said bolt holt in the arcuate socket, the head of said bolt frictionally engaging the inner surface of said ball-segment interior thereof, means on said bolt to tighten the knuckle ball-segment and socket together, and means on said socket for joining it to a tool supporting column, said means being offset from the axis of the T-bolt to permit ready access to the tightening means thereon.

5. A socket clamp comprising a slotted hollow knuckle ball-segment secured to a portion of the frame of a machine to be clamped, an arcuate socket having a central bolt holt, a bolt extending through the slot in the ball-segment and having its threaded shank inserted through said bolt hole in the arcuate socket, the head of said bolt frictionally engaging the inner surface of said ball-segment in the clamped position, means on said bolt to tighten the knuckle ball-segment and socket together, and means on the said socket for joining it to a tool column.

6. A socket clamp comprising a transversely slotted hollow knckle ball-segment secured to a portion of the frame of a machine to be clamped, an arcuate socket having a central bolt hole, a T-bolt having a square shank equal to and fitted in said slot and its threaded shank inserted through said bolt hole in the arcuate socket, knurled means between said bolt head and the interior of said hollow knuckle ball-segment, means on said bolt to tighten the knuckle ball-segment and socket together, and means on said socket for joining it to a tool supporting column.

7. A socket clamp comprising a transversely slotted hollow semi-circular segment having inner teeth lateral of said slot, said segment being secured to a portion of the frame of a machine to be clamped, an arcuate socket having a central bolt hole; a T-bolt having a square shank equal to and fitted in said slot, toothed portions on the under side of the head of said T-bolt and cooperable with the teeth interior of said hollow segment, and a threaded shank inserted through said bolt hole in the arcuate socket; means on said bolt to tighten the knuckle ball-segment and socket together, and means on said socket for joining it to a tool supporting column.

3. A socket clamp comprising a semi-circular segment to be clamped and having an inner cupped surface and being transversely slotted, knurling on said inner surface adjacent the edges of the slot, a socket adapted to receive said segment, a bolt for clamping said segment in the socket and including means cooperable with the knurling in the segment, and means on said socket member offset from the axis of the bolt to permit access thereto and for joining the socket to a supporting member.

WILLIAM G. SMITH.